United States Patent [19]
Nayar et al.

[11] Patent Number: 5,058,986
[45] Date of Patent: Oct. 22, 1991

[54] NON-LINEAR INFERFEROMETER

[75] Inventors: Bimal K. Nayar; Keith J. Blow; Nicholas J. Doran, all of Suffolk, England

[73] Assignee: British Telecommunications public limited company, United Kingdom

[21] Appl. No.: 447,125

[22] Filed: Dec. 11, 1989

[30] Foreign Application Priority Data

Dec. 19, 1988 [GB] United Kingdom ............ 8829546

[51] Int. Cl.$^5$ .......................... G02B 6/02; G02B 6/16
[52] U.S. Cl. .................................... 385/27; 385/122; 385/15
[58] Field of Search ...................... 350/96.29

[56] References Cited

FOREIGN PATENT DOCUMENTS 0265233 4/1988 European Pat. Off. .

OTHER PUBLICATIONS

The Journal of the Optical Society of America B/Optical Physics, vol. 4, No. 11, Nov. 1987, pp. 1843-1846, Optical Society of America, Woodbury, N.Y., U.S.; Doran et al: "Soliton Processing Element for All-Optical Switching and Logic".

Electronics Letters, vol. 24, No. 6, 17th Mar. 1988, pp. 340-341, Stevenage, Herts., GB; I. H. White et al.: "Demonstration of the Optical Kerr Effect in al Al-l-Fibre Mach-Zehnder Interferometer at Laser Diode Powers".

Primary Examiner—William L. Sikes
Assistant Examiner—Robert E. Wise
Attorney, Agent, or Firm—Nixon & Vanderhye

[57] ABSTRACT

An optical fibre, loop interferometer (31) is formed from germania doped silica which exhibits Raman scattering at a threshold intensity to provide a transmitted optical signal from port (49) of coupler (35) whose intensity is a sigmoid function of the intensity of an optical signal input at port (39). It finds application in optical switching and logic operations on optical pulses.

7 Claims, 5 Drawing Sheets

MEASURED NORMALISED PEAK REFLECTED AND TRANSMITTED POWER FRACTIONS AS A FUNCTION OF THE PEAK INPUT POWER.

NON-LINEAR INFERFEROMETER

FIELD OF THE INVENTION

This invention relates to non-linear interferometers for use, for example, as optical switches or logic gates.

BACKGROUND OF THE INVENTION

The advantages of all optical signal processing for high bit rate systems are being increasingly recognised, primarily for their potential for performing switching and logic operations, for example, at extremely rapid rates since optical frequencies are of the order of $10^{14}$ Hz. In order to exploit this potential it is necessary to construct devices whose response is determined by the optical input. This essentially means a device which responds differently to different intensities of input optical signal, that is, an optically non-linear device.

One approach to obtaining such a non-linear device is to employ an interferometer arrangement comprising an optical splitter which splits an input signal into two portions of different intensities which travel along an optically non-linear transmission medium, or media, to an optical combiner. An example of such device is described in the applicant's co-pending application EP 0265233 A1 which comprises an optical waveguide formed from an optical fibre having non-linear refractive index coupled to a first pair of ports of an optical coupler. In this configuration the coupler acts as both the splitter to split an input optical signal into two counter-propagating signal portions of different intensity round a common, non-linear medium and as the combiner.

The output from the combiner is dependent on the final relative phase shift of the two portions after they have propagated from the splitter to the combiner. In particular, as discussed in detail in the above referenced application, the output from the ports of the coupler is an oscillatory, periodic, function of the intensity of the input signal. The difference of the maximum and minimum intensities between which the output signal oscillates, the contrast ratio, is a function of the asymmetry of the splitter. The same oscillatory behaviour can also be realised in other interformeter arrangements, for example a Mach-Zehnder interferometer. Such interferometers, which include a non-linear transmission medium, will be referred to hereinafter as non-linear interferometers.

Such known non-linear interferometers can be used for switching and logic applications but they suffer from the disadvantage that intensity of the input signal must be controlled within predetermined bounds to ensure that the intensity of the output signal remains close to some predetermined threshold level which determines that the output is of a given logic level. If the intensity of the input signal increases too much the output of the device reverts to the other logic level.

SUMMARY OF THE INVENTION

It is an object of the present invention to provide an optical device which does not require the previously required degree of control of the intensity of the input signal to the device. Accordingly, a non-linear interferometer including an optically non-linear transmission medium for producing an intensity dependant, relative phase shift between portions of an input optical signal is characterised in that the transmission medium exhibits an intensity dependant optical scattering having a threshold such that the output intensity is at most a single period function of the intensity of the input signal.

The intensity dependant optical scattering of the transmission medium causes the intensities of the two portions to be limited to substantially the same intensity after propagating some distance along the transmission medium. This has the effect of flattening the oscillatory output intensity at some point corresponding to a respective input signal intensity. Consequently the output intensity from interferometer will be a substantially constant function of input intensity for at least a significant range of input intensity. This desired output intensity level is therefore less sensitive to the input intensity at this point. In particular, the transmission medium can be chosen to exhibit scattering at an intensity which will produce an output intensity which is a sigmoid response i.e. step-like, to the input intensity.

BRIEF DESCRIPTION OF THE DRAWINGS

An embodiment of the invention and its method of operation will now be described by way of example only with reference to the accompanying drawings in which.

DETAILED DESCRIPTION OF THE DRAWINGS

Figure 1:
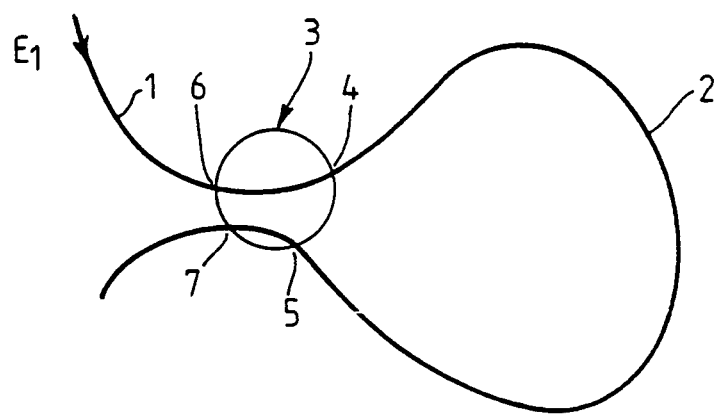
FIG. 1 is a schematic diagram of a known fibre loop interferometer.

The prior art optical device shown in FIG. 1 is an interferometer defined by a single silica optical fibre 1 formed into a loop 2 which fibre constitutes the transmission medium. Portions of the optical fibre 1 are positioned close to one another to define a cross-coupler 3 having a pair of first ports 4, 5 and a pair of second ports 6, 7. The coupler 3 is adapted to couple portions of an optical signal received at the ports 6 or 7 into each of the ports 4, 5 in accordance with a predetermined coupling ratio a. Similarly, optical signals arriving at the coupler 3 received by either the port 4 or port 5 will be coupled by the same coupling ratio into the ports 6, 7.

Thus, under normal (linear) circumstances the device shown in FIG. 1 will operate as a mirror. That is with the input $E_1$ at the port 6, the light all returns back to the port 6 if the coupling ratio is 50:50. Another value for the coupling ratio will give an appropriate split in the output power between the two ports 6, 7. By convention, light exiting at ports 6 and 7 is said to be reflected and transmitted respectively.

The coupler 3 causes a single input $E_1$ to be split into two counter propagating fields which return in coincidence to combine back at the coupler 3. The optical path length is precisely the same for both propagating fields since they follow the same path but in opposite directions. When operating at intensities in the linear regime the fields will emerge the same, i.e. independent of which way round they traverse the loop; non-linearly this may not be the case as will now be described because the non-linearity can break the identical propagation effect for the two paths.

Consider the situation where the loop 2 of the waveguide is formed at least partly from a non-linear material exhibiting a refractive index n given by the formula:

$$n = n_o + n_2 |E|^2$$

where $n_o$ is the linear refractive index, $n_2$ is the Kerr co-efficient, and $|E|^2$ is the intensity of the transmitted signal.

In this situation, signals with different intensities when fed in opposite directions around the waveguide will experience different refractive indices. As will be explained below, this results in the signals experiencing different phase shifts so that when the signals return back to the coupling means, they have an intensity dependent relative phase shift. By varying the coupling ratio, a, and/or the length of the waveguide, for example, it is possible to vary the phase shift between the returning signals for any particular working intensity of input signal. The intensity dependence of the relative phase shift results in a device whose output is an oscillatory function of the intensity of the input signal.

For a $\neq 0.5$ the signals propagating in the opposite directions in the loop fibre experience different intensity dependent phase change and the transmittivity, T, is given by $$T = P_t / P_i = 1 - 2a(1-a)[1 + \cos(1-2a)\phi]$$

where $\phi$ is the nonlinear phase shift given by $$\phi = (2\pi/\lambda) n_2 l (P_i / A_{eff})$$

and $P_t$ and $P_i$ are the transmitted and input powers respectively, l is the fibre loop length, $\lambda$ is the wavelength, $n_2$ is the optical Kerr coefficient, and $A_{eff}$ is the effective mode area. The transmittivity shows nonlinear switching behaviour between the low power value, i.e. $1 - 4a(1-a)$, and 1 whenever $P_i$ increases by $$\lambda a A_{eff} / [2(1-2a) n_2 L]$$

For silica based fibres $n_2 = 3.2 \times 10^{-16}$ cm$^2$/Wm, and taking $\lambda = 1.06$ μm and fibre areas 100 μm$^2$ then:

$$|E|^2 L = \frac{\pi}{(1-2a)} \times 5 \times 10^2$$

Figure 2:
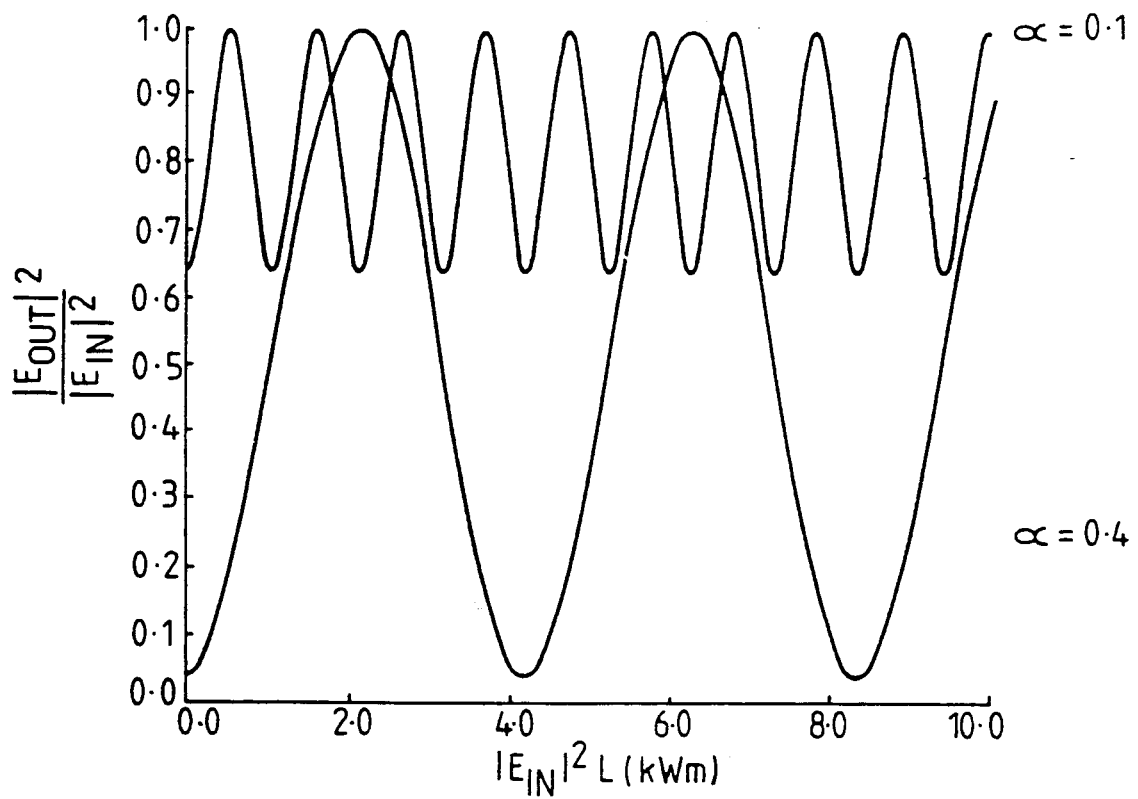
FIG. 2 illustrates graphically the variation between the input intensity and output intensity (after normalisation) for two different coupling ratios of a device as shown in FIG. 1.

For the example of a=0.4 then we need $|E|^2 = 8$ kW for L=1 m. If a=0.1 then the required peak power comes down to 1.9 kW but the switching contrast is correspondingly reduced as shown in FIG. 2 which shows the variation between input intensity and output intensity (after normalisation) for two different coupling ratios.

It is also known to use other interferometric arrangements to obtain an optical output which is a sinusoidal function of the intensity of an input signal, for example the Mach-Zehnder configuration, although the loop arrangement of FIG. 1 has the advantage of automatically ensuring the two propagation paths are identical. Transmission media other than optical fibres can also be employed, for example planar waveguides formed in substrates, or materials included in the optical paths of a bulk optical interferometer.

The applicants have realised that if the transmission exhibits an intensity dependent optical scattering it will act as limiter for the input power and to a first approximation will prevent any further variation in the differential phase shift of the two input signal portions with input signal intensity above a corresponding input intensity threshold. In particular, the material can be selected so that the threshold of the scattering produces a sigmoid response of output intensity as a function of input intensity which provides an optical device whose output is far more stable to small variations of input intensity at the high input intensity switch state.

In the case of silica optical fibres, spontaneous Raman scattering can be used as the optical scattering mechanism as its threshold can be reduced by changing the fibre dopants. In particular, GeO$_2$ doping increases the Raman gain co-efficient. The Raman gain co-efficient, g, for GeO$_2$ doped fibres is related to that for the pure SiO$_2$ fibres by $$g = g_o (1 + 80\Delta)$$

where $$\Delta = 1 - (n_{cl} / n_c)$$

and $g_o$ is the Raman gain co-efficient of pure silica fibre and has a value $7.4 \times 10^{-14}$ m/W.

Other means for determining the Raman gain threshold can be employed for the purpose of the present invention. For example, polarisation maintaining fibre has a lower threshold power than non-polarisation maintaining fibre of the same materials.

Figure 3:
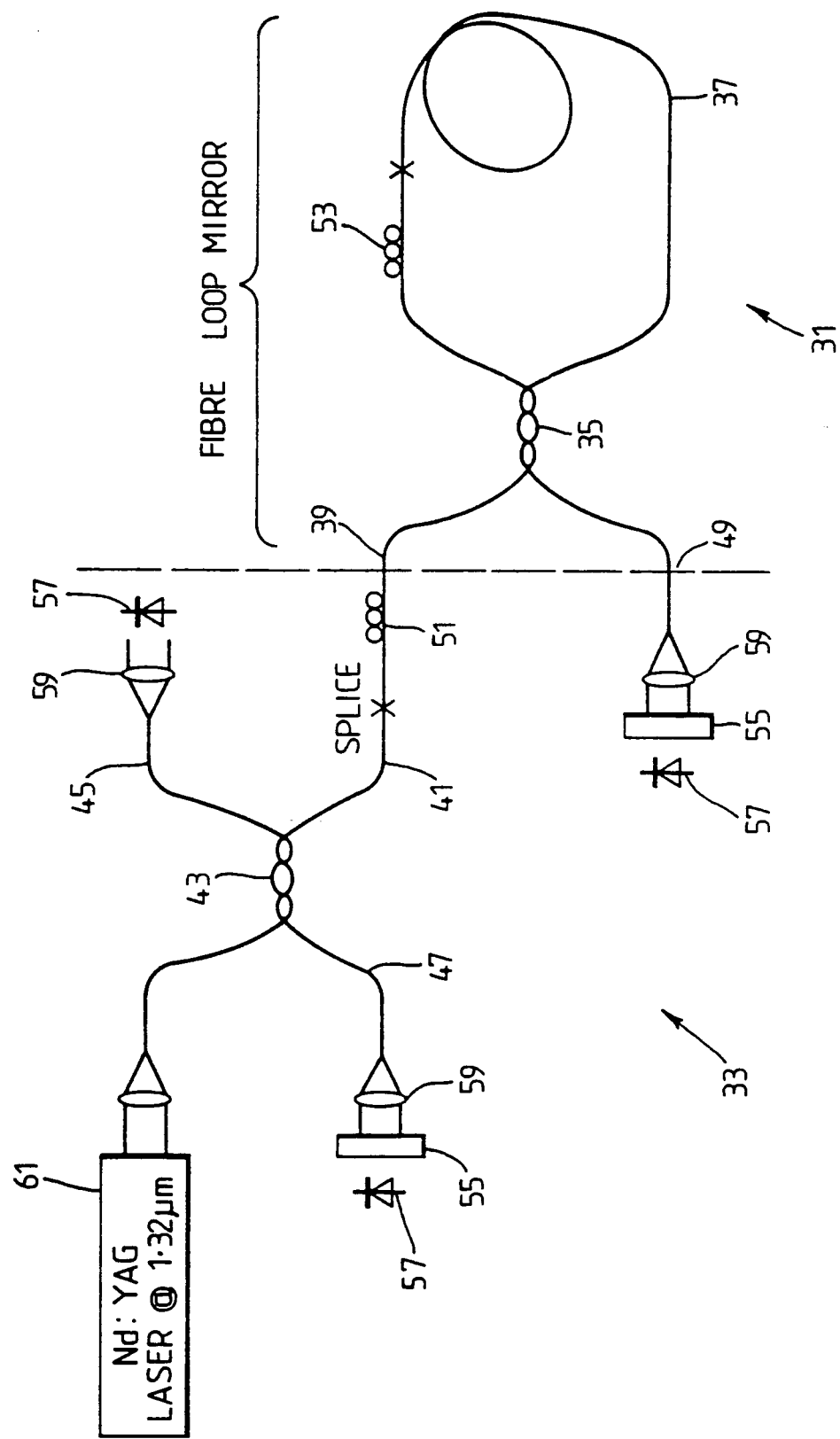
FIG. 3 is a schematic diagram of an experimental arrangement used to measure the non-linear response of the device of FIG. 1.

Referring now to FIG. 3 a fibre loop mirror constituting an interferometer 31 according to the present invention is coupled to apparatus 33 for investigating the non-linear response of the interferometer 31.

The device 31 is essentially a fibre directional coupler 35 with power-coupling ratio a: (1−a) having its output ports spliced to a British Telecom, high-germania silica fibre 37 with a Δn of 0.02 and a higher mode cut-off of 1.125 μm. The fibre was weakly polarisation maintaining with the polarisation holding parameter, h, of $3.2 \times 10^{-3}$ m$^{-1}$ at 1.32 μm. The loop mirror 31 (loop length 25 m) was fabricated by splicing the output arms of length 24 m and 1 m respectively of the directional coupler 35 which had a splitting ratio 38:62. The input port 39 of the mirror was spliced to a port 41 of a second directional coupler 43 which had a splitting ratio of 52:48. In this configuration the outputs from the three other ports 45, 47 and 49 of the coupler 43 can be used to monitor the input power to provide a measure of the reflected and transmitted powers of the interferometer 31 respectively.

The nonlinear response of the device was investigated using both Q-switched pulses (~850 ns FWHM and 500 repetition rate) and CW mode-locked pulses (~180 ps FWHM and 76 MHz repetition rate) of a Nd:YAG laser 61 operating at 1.32 μm wavelength. In this device configuration the splices and couplers act as depolarising elements and it is necessary to control the polarisation using mechanical fibre polarisation controllers 51 and 53, at the input of the interferometer 31 and in the loop respectively. However, for a given setting of the polarisation controllers the output of the loop mirror 31 was generally stable for the duration of the experimental measurements (several hours). For the investigation of the nonlinear behaviour of the device 31 the polarisation controllers 51 and 53 were set to give minimum transmission at a lower power. The linear transmittivity was measured to be 0.06 which is the value given by the measured a. The total insertion loss of the device was measured to be ~3 dB. The input, the reflected and the transmitted signals were monitored using narrow band pass filters (NBFs) 55, collimating lenses 59, and fast InGaAs photodiodes 57 coupled to the output ports by lenses 59.

Figure 4:
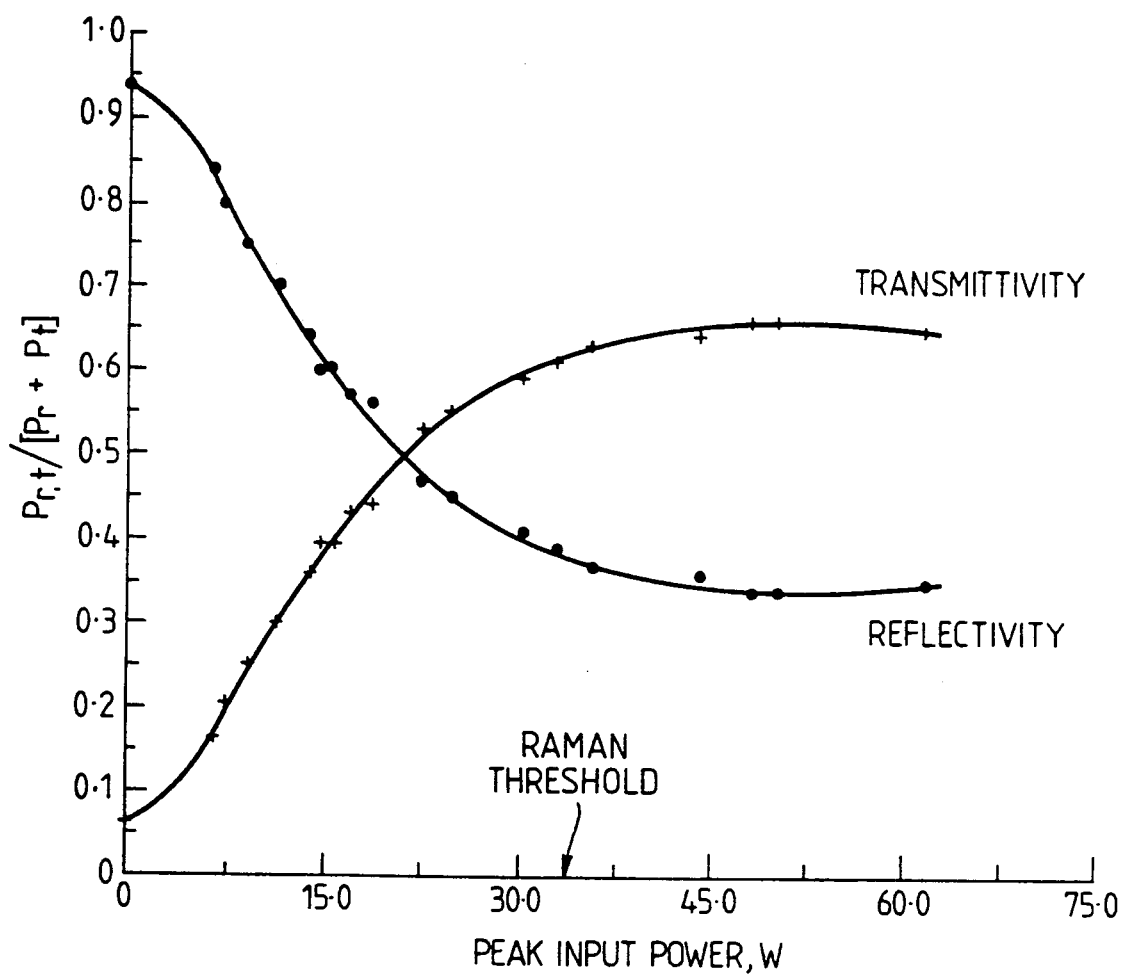
FIG. 4 is a graph of the response of the device of FIG. 1 as a function of peak input power.

All three signals were simultaneously displayed on a three channel EG&G 4420 digital boxcar operating in temporal waveform recovery mode. This measurement approach overcomes any ambiguity due to pulse-to-pulse amplitude fluctuations and the use of NBFs allowed investigation of the behaviour of the loop mirror 31 at power levels above the Raman threshold. The peak input, reflected $P_r$ and transmitted $P_t$ powers of the pulse were measured. These were used to plot the peak reflectivity and transmittivity $P_{rt}/(P_r+P_t)$ as a function of the peak input power and these are displayed in FIG. 4. The curves clearly show a nonlinear increase in the transmittivity with a corresponding decrease in the reflectivity and the overall sigmoid response of the output of the interferometer 31. At high input peak powers Stokes radiation was observed due to spontaneous Raman scattering. This has the effect of limiting the available pump power at 1.32 μm and hence the device response shows saturation. Significantly, there is a large change in the transmittivity, from 0.06 to 0.6, with the change in input peak power from 0.1 W to 33 W. The cross-over point occurs for a peak input power of 22 W. It is anticipated that reductions in power by working with longer loops (>100 m) would be obtainable but the very good stability observed in the particular device 31 of FIG. 3 would gradually deteriorate.

Figure 5A:
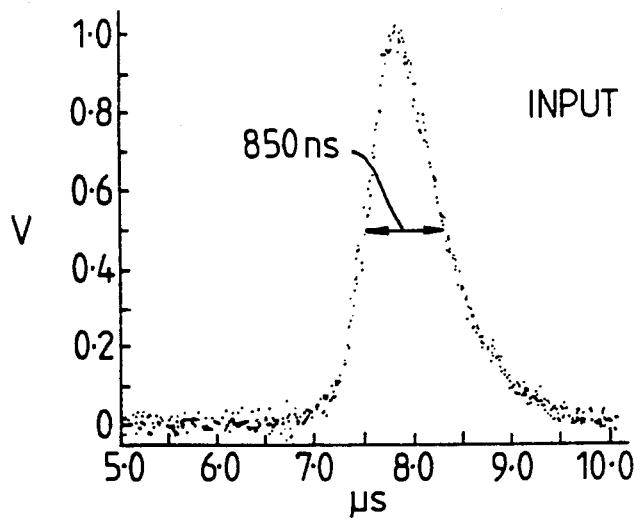
FIGS. 5(a) to (c) are graphs of input, reflected and transmitted pulses corresponding to a peak input power of 12.5 W from a Q-switched laser.
Figure 5B:
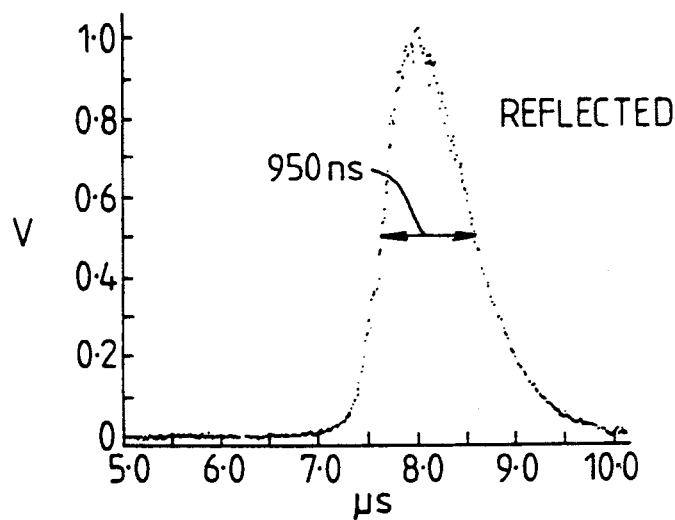
Figure 5C:
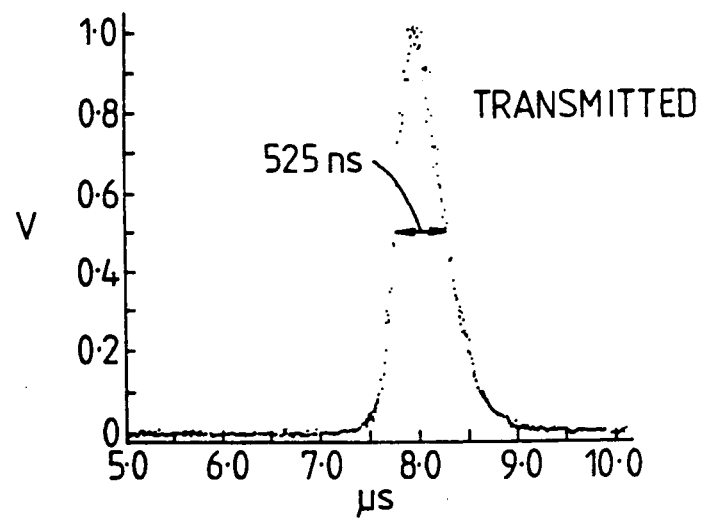
Figure 6:
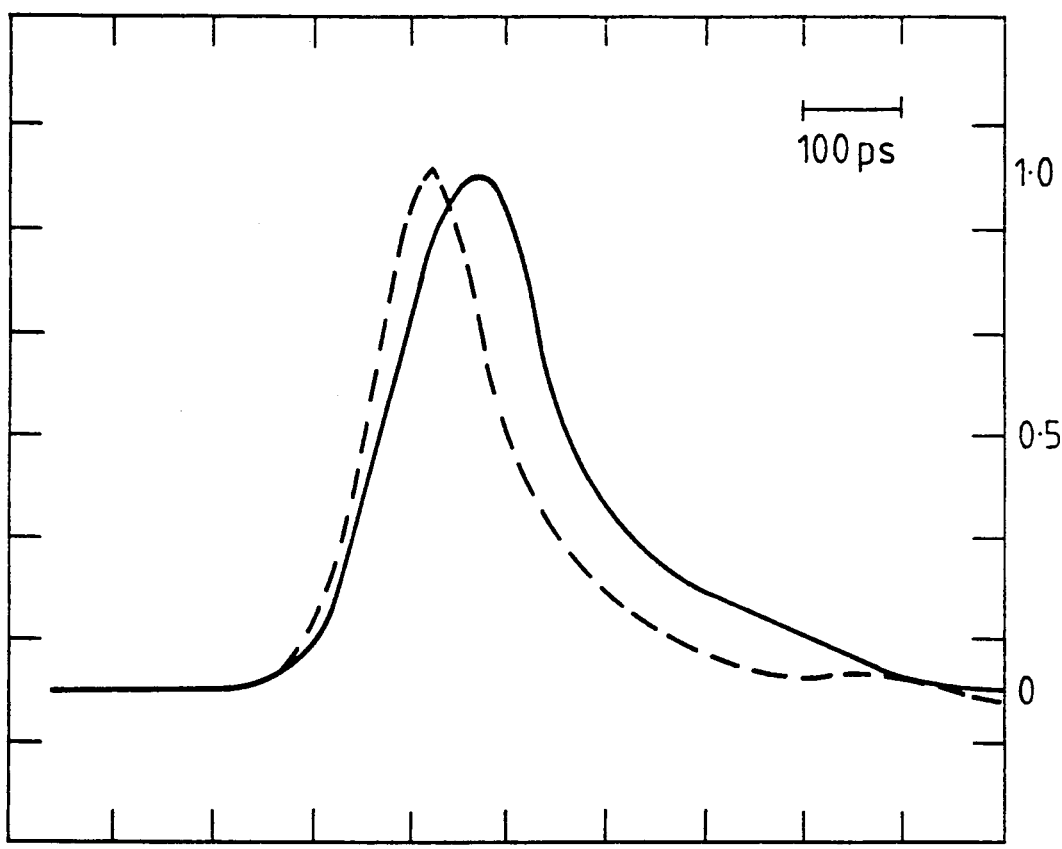
FIG. 6 is a graph of the transmitted and reflected pulses generated by a mode locked laser input pulse of 15.8 W peak power.

Referring now to FIGS. 5a, 5b and 5c the input (FWHM=850 ns), reflected (FWHM=930 ns) and transmitted (FWHM=525 ns) pulses for a peak input power of 12.5 W are shown. It can be clearly seen that at high power levels the transmitted pulse shows narrowing whilst the reflected pulse shows broadening. This implies that we do not observe complete pulse switching, i.e. the high power parts of the pulse switch rather than its wings. For this reason FIG. 4 describes the device behaviour for square pulses (pulse duration >> rise and fall times). The above experiment with the Q-switched pulses is in the quasi-CW regime; where the pulse length (~175 m) is long compared to the loop length. In this case the nonlinear phase shift is induced by cross-phase modulation. The experiments with CW mode-locked pulses (FWHM ~180 ps) show a similar nonlinear behaviour. In FIG. 6 the reflected (FWHM ~195 ps) and transmitted (FWHM ~150 ps) pulses are shown for a peak power of 15.8 W. In this case the pulse length (~0.04 m) is much shorter than the loop length and the nonlinear phase shift is induced by self-phase modulation. The above experiments demonstrate that the switching is incomplete for non-square pulses. This has implications for ultra-fast high bit rate systems in that it is necessary to either produce square optical pulses (non-trivial) or to use "soliton" like pulses which can allow complete switching. For a loop of 25 m, as used here, good soliton-switching can be expected for pulse durations of 0.5 ps. Such pulses can be obtained for example from the "soliton" laser. Incomplete switching with square pulses due to pump depletion by Raman effect can be avoided by using silica fibres with a lower germania content. For example in our case the Raman gain coefficient is ~3 x that for a pure silica fibre.

It will be appreciated that the present invention is applicable to configurations of non-linear interferometers other than these specifically described above, and that intensity dependant optical scattering mechanisms other than Raman scattering may be employable to provide the required optical limiting, for example Brillouim scattering.

We claim:

1. A non-linear interferometer having an output and an input and including an optically non-linear transmission medium producing an intensity dependent, relative phase shift between portions of an input optical signal, said transmission medium having an intensity dependent optical scattering above a predetermined non-zero intensity threshold such that the output intensity is at most a single period function of the intensity of the input signal.

2. An interferometer as in claim 1 in which the interferometer comprises a fiber loop.

3. An interferometer as in claim 1 or 2 in which the intensity dependant optical scattering includes Raman scattering.

4. An interferometer as in claim 3 in which the transmission medium includes a germania doped silica optical fibre.

5. An interferometer as in claim 1 or 2 in which the optically non-linear transmission medium comprises polarisation-maining optical fibre.

6. An interferometer as in claim 1 or 2 in which the output intensity is a sigmoid function of the intensity of the input signal.

7. A non-linear interferometer as in claim 1 or 2 wherein said non-linear transmission medium has ends coupled to receive a portion of the optical input at each end, the intensities of the two portions being limited to substantially the same intensity after propagating a sufficient distance along the transmission medium above a predetermined input signal intensity due to said intensity-dependent scattering.

* * * * *